US012659125B2

(12) United States Patent
Matsumura et al.

(10) Patent No.: US 12,659,125 B2
(45) Date of Patent: Jun. 16, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 290 days.

(21) Appl. No.: 18/282,930

(22) PCT Filed: Mar. 25, 2021

(86) PCT No.: PCT/JP2021/012587
§ 371 (c)(1),
(2) Date: Sep. 19, 2023

(87) PCT Pub. No.: WO2022/201440
PCT Pub. Date: Sep. 29, 2022

(65) Prior Publication Data
US 2024/0178982 A1 May 30, 2024

(51) Int. Cl.
H04L 5/00 (2006.01)
(52) U.S. Cl.
CPC .................................. H04L 5/0096 (2013.01)
(58) Field of Classification Search
CPC .................................................. H04B 7/06968
See application file for complete search history.

(56) References Cited

U.S. PATENT DOCUMENTS

| | | | |
|---|---|---|---|
| 2020/0229161 A1* | 7/2020 | Raghavan | ............. H04W 24/10 |
| 2021/0378042 A1* | 12/2021 | Cui | ........................ H04W 76/20 |
| 2022/0173862 A1* | 6/2022 | Venugopal | ......... H04B 7/06968 |
| 2023/0276283 A1* | 8/2023 | Hakola | .................. H04W 24/10 |
| | | | 370/329 |
| 2024/0064770 A1* | 2/2024 | Tidestav | ............. H04W 72/232 |

OTHER PUBLICATIONS

International Search Report issued in PCT/JP2021/012587 on Nov. 2, 2021 (1 page).
Written Opinion of the International Searching Authority issued in PCT/JP2021/012587 on Nov. 2, 2021 (3 pages).
(Continued)

*Primary Examiner* — Shukri Taha
(74) *Attorney, Agent, or Firm* — Osha Bergman Watanabe & Burton LLP

(57) ABSTRACT

A terminal according to one aspect of the present disclosure includes a receiving section that receives indication information about switching of a transmission configuration indication (TCI) state for a plurality of serving cells, and a control section that determines delay time for application of a TCI state in TCI state switching based on information related to a quasi-co-location (QCL) source reference signal (RS) in the TCI state in each serving cell of the plurality of serving cells and the indication information. According to one aspect of the present disclosure, it is possible to perform TCI state indication appropriately.

5 Claims, 13 Drawing Sheets

(56)            References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Patent Application No. 2023-508323, mailed on Dec. 24, 2024 (6 pages).
Huawei, HiSilicon; "CR on multiple SCell activation requirements R17"; 3GPP TSG-RAN4 Meeting #98-e, R4-2102790; Electronic Meeting; Jan. 25-Feb. 5, 2021 (14 pages).

* cited by examiner

1 Octet

| Cell ID | BWP ID |
|---|---|
| 1st TCI state ID | P1 |
| 2nd TCI state ID | P2 |
| 3rd TCI state ID | P3 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a user terminal (terminal, User Equipment (UE)) that controls transmission/reception processing based on information related to quasi-co-location (QCL) (QCL assumption/Transmission Configuration Indication (TCI) state/spatial relation) is under study.

For Rel. 17 (or later versions), reduction of delay time necessary for TCI state switching/activation is under study.

However, a method for reducing the delay time has not been fully studied. Unless this study is fully performed, communication quality reduction, throughput reduction, and the like may occur.

Thus, an object of the present disclosure is to provide a terminal, a radio communication method, and a base station that perform TCI state indication appropriately.

Solution to Problem

A terminal according to one aspect of the present disclosure includes a receiving section that receives indication information about switching of a transmission configuration indication (TCI) state for a plurality of serving cells, and a control section that determines delay time for application of a TCI state in TCI state switching based on information related to a quasi-co-location (QCL) source reference signal (RS) in the TCI state in each serving cell of the plurality of serving cells and the indication information.

Advantageous Effects of Invention

According to one aspect of the present disclosure, it is possible to perform TCI state indication appropriately.

BRIEF DESCRIPTION OF DRAWINGS

FIG. 5 is a diagram to show an example of a MAC CE according to Embodiment 3-1.

Figure 1:
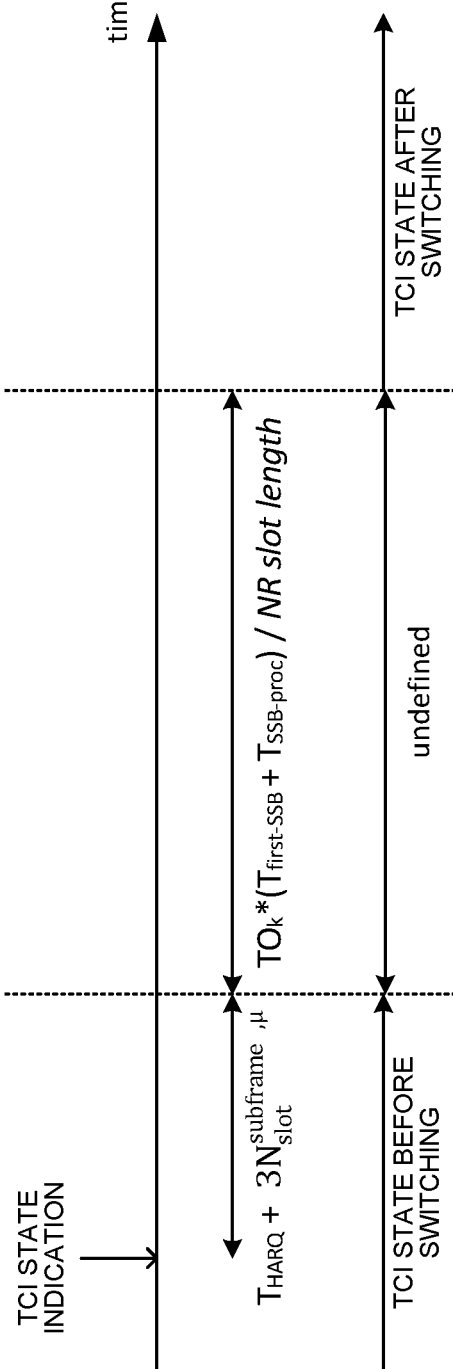
FIG. 1 is a diagram to show an example of a timeline for TCI state switching/activation defined in Rel. 15/16 (or earlier versions).

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter (s) (or parameter set (s)) that can be assumed to be the same, and such parameter (s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter Such QCL information as shown in QCL type A to QCL type D mentioned above may be referred to as a QCL property.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS to have a relationship of QCL type X with (a DMRS for) a certain channel/signal, and this RS may be referred to as a QCL source of QCL type X in the TCI state.

(TCI State Switching)

In Rel. 15/16, delay time for active TCI state switching is defined, the delay time being for the UE for which one or more TCI states in a serving cell have been configured.

Even if the UE measures/stores/holds the QCL property, as long as the UE does not perform L1-RSRP reporting/beam reporting to a network (NW, for example, a base station), the NW fails to recognize whether the UE measures/stores/holds the QCL property. Thus, it is necessary that the UE performs measurement and reporting of a beam/RS and that the UE and the NW share common recognition of whether a TCI state is known or unknown.

In Rel. 16, a case that the TCI state is known is a case that condition 0 to condition 5 below are satisfied;

(Condition 0): From last transmission of an RS resource used for reporting of L1-RSRP measurement for a target TCI state until completion of active TCI state switching, the RS resource for the L1-RSRP measurement is an RS in the target TCI state or an RS being in a QCL relationship with the target TCI state.

(Condition 1): TCI state switch indication (TCI state switch command) is received within 1280 ms from last transmission of an RS resource for beam reporting or measurement.

(Condition 2): The UE transmits at least one L1-RSRP report for the target TCI state before the TCI state switch indication.

(Condition 3): During a TCI state switching period, detection of the TCI state remains available.

(Condition 4): During the TCI state switching period, detection of an SSB associated with the TCI state remains available.

(Condition 5): A Signal to Noise Ratio (SNR) of the TCI state is −3 dB or more.

A case that the TCI state is unknown means that the TCI state is not known.

Note that in the present disclosure, a TCI state that is known may be referred to as a "known TCI state," and a TCI state that is unknown may be referred to as an "unknown TCI state."

When a MAC CE is used for TCI state switching (MAC-CE based TCI state switch), and a target TCI state (TCI state after the switching) is a known TCI state, if the UE receives, in slot n, a physical downlink shared channel (PDSCH) including a TCI state activation command (TCI state indication), the UE receives, in the first slot after slot $n+T_{HARQ}+3N^{subframe,\mu}_{slot}+TO_k*(T_{first-SSB}+T_{SSB-proc})/(NR$ slot length), a physical downlink control channel (PDCCH) in the target TCI state for a serving cell in which the TCI state switching has occurred. The UE can receive the PDCCH in a previous TCI state (before the switching) until slot $n+T_{HARQ}+3N^{subframe,\mu}_{slot}$. In a period from slot $n+T_{HARQ}+3N^{subframe,\mu}_{slot}$ until slot $n+T_{HARQ}+3N^{subframe,\mu}_{slot}+TO_k*(T_{first-SSB}+T_{SSB-proc})/(NR$ slot length), a TCI state applied by the UE is undefined (see FIG. 1).

Here, $T_{HARQ}$ indicates time from downlink data signal (for example, PDSCH) communication to transmission confirmation information (for example, HARQ-ACK information). $N^{subframe,\mu}_{slot}$ represents the number of slots per subframe for subcarrier configuration μ. $T_{first-SSB}$ is time for the UE to transmit an SSB first after decoding a MAC CE command used for TCI state activation. $T_{SSB-proc}$ is 2 ms. $TO_k$ is 1 when the target TCI state is not included in a list of active TCI states for the PDSCH, otherwise $TO_k$ is 0. NR slot length indicates a slot length.

Figure 2:
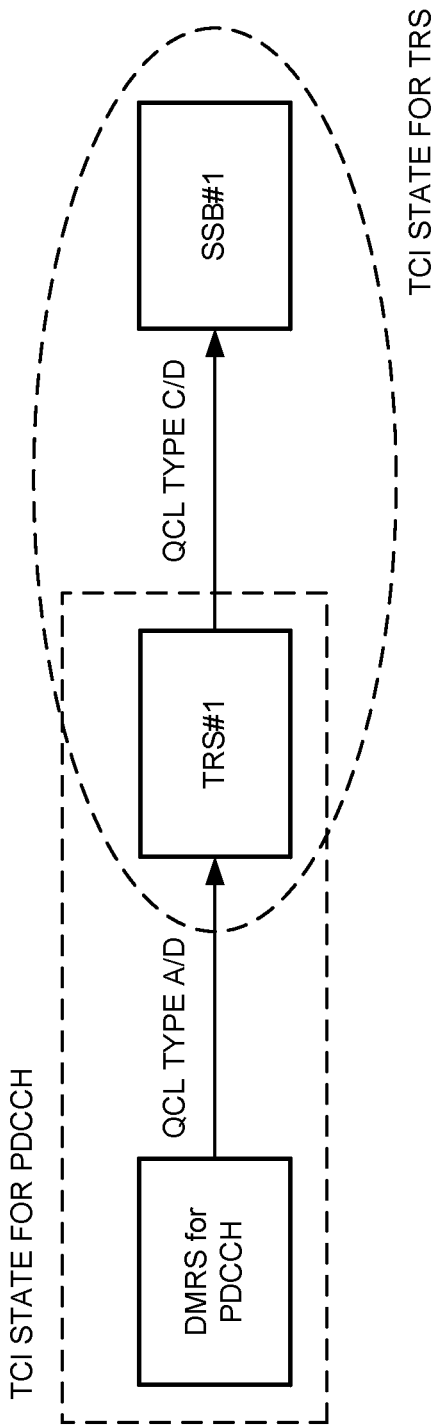
FIG. 2 is a diagram to show an example of a TCI state defined in Rel. 16 (or earlier versions).

FIG. 2 is a diagram to show an example of the TCI state defined in Rel. 16 (or earlier versions). As shown in FIG. 2, the TCI state for the PDCCH indicates a relationship of QCL type A/D between a demodulation reference signal (DMRS) for the PDCCH and a TRS (or a CSI-RS, here, TRS #1). The TCI state for the TRS indicates a relationship of QCL type C/D between the TRS and the SSB (here, SSB #1).

When the MAC CE is used for TCI state switching, and the target TCI state is an unknown TCI state, if the UE receives, in slot n, a PDSCH including a TCI state activation command, the UE receives, in the first slot after slot $n+T_{HARQ}+3N^{subframe,\mu}_{slot}+T_{L1-RSRP}+TO_{uk}*(T_{first-SSB}+T_{SSB-proc})/(NR$ slot length), a PDCCH in the target TCI state for a serving cell in which the TCI state switching has occurred. The UE can receive the PDCCH in a previous TCI state (before the switching) until slot $n+T_{HARQ}+3N^{subframe,\mu}_{slot}$.

Here, $TO_{uk}$ is 1 for L1-RSRP measurement using the CSI-RS or for TCI state switching for which a QCL type other than QCL type D is configured. On the other hand, $TO_{uk}$ is 0 for a case of TCI state switching for which at least QCL type D is configured and L1-RSRP measurement using the SSB.

$T_{first-SSB}$ is time to transmit an SSB first after L1-RSRP measurement in a case where TCI state switching for which at least QCL type D is configured is performed. Alternatively, $T_{first-SSB}$ is time for the UE to transmit an SSB first after decoding a MAC CE command used for TCI state activation for which anything other than QCL type D is configured.

When the target TCI state is an unknown TCI state, time $T_{L1-RSRP}$ is additionally necessary for the TCI state switching compared to a case where the target TCI state is a known TCI state. $T_{L1-RSRP}$ is time related to received power measurement. $T_{L1-RSRP}$ is 0 in a case of frequency range (FR) 1 or in a case of FR2 in which QCL type D is not configured. Otherwise, $T_{L1-RSRP}$ is time necessary for determination/refinement of a receive beam in FR2.

When downlink control information (DCI) is used for TCI state switching (DCI based TCI state switch), and the target TCI state is a known TCI state, if a higher layer parameter "tci-PresentInDCI" for a CORESET to schedule a PDSCH is set to "enabled" for the UE in slot n, the UE receives, in the first slot after slot n+timeDurationForDCI, the PDSCH in the target TCI state for a serving cell in which the TCI state switching has occurred. Here, timeDurationForDCI is time required for reception of a PDCCH and for application of spatial relation/QCL-related information (spatial QCL information) to reception of DCI for a PDSCH.

Furthermore, when RRC signaling is used for TCI state switching (RRC based TCI state switch), and the target TCI state is a known TCI state, if the UE receives, in slot n, a PDSCH to communicate a TCI state RRC activation command, the UE receives, in the first slot after slot $n+(T_{RRC\_processing}+TO_k*(T_{first-SSB}+T_{SSB-proc}))/(NR$ slot length), a PDCCH in the target TCI state for a serving cell in which the TCI state switching has occurred.

Here, $T_{RRC\_processing}$ is a delay related to RRC processing (RRC processing delay). $T_{first-SSB}$ is time to transmit an SSB first after RRC processing by the UE. $T_{SSB-proc}$, $TO_k$, and (NR slot length) are similar to those of the case of the known TCI state in the TCI state switching using the MAC CE.

When RRC signaling is used for TCI state switching (RRC based TCI state switch), and the target TCI state is an unknown TCI state, if the UE receives, in slot n, a PDSCH to communicate a TCI state RRC activation command, the UE receives, in the first slot after slot $n+(T_{RRC\_processing}+T_{L1-RSRP}+TO_{uk}*(T_{first-SSB}+T_{SSB-proc}))/(NR$ slot length), a PDCCH in the target TCI state for a serving cell in which the TCI state switching has occurred.

Here, $T_{RRC\_processing}$ is a delay related to RRC processing (RRC processing delay). $T_{SSB-proc}$, $TO_{uk}$, and (NR slot length) are similar to those of the case of the unknown TCI state in the TCI state switching using the MAC CE.

$T_{first-SSB}$ is time to transmit an SSB first after L1-RSRP measurement in a case where TCI state switching for which at least QCL type D is configured is performed. Alternatively, $T_{first-SSB}$ is time for the UE to transmit an SSB first after decoding a MAC CE command used for TCI state activation for which anything other than QCL type D is configured.

As mentioned above, it is necessary for the UE to receive a MAC CE for TCI state activation/switching and stand by for SSB reception after transmitting a response signal (ACK) for the MAC CE, thereby causing delay time (for example, approximately 20 ms) to occur until the TCI state switching is actually performed. In terms of low latency, it is preferable that this delay time is reduced.

However, a study for reduction of this delay time has not been fully performed. Unless this study is fully performed, communication quality reduction, throughput reduction, and the like may occur.

When carrier aggregation (CA) is configured, a case where beam reporting (for example, beam reporting based on L1-RSRP/L1-SINR measurement (L1-RSRP/L1-SINR beam reporting)) is configured in a certain CC and where the beam reporting is not configured in another CC is conceivable. This is because it is unnecessary to configure the beam reporting for each CC because it is assumed that identical TCI states are configured in all CCs when CA in an identical band is performed.

On the other hand, whether a TCI state is known or unknown is judged for each serving cell, and thus there are concerns that a known/unknown condition varies for each cell (CC). Specifically, there is a possibility that a TCI state known in a CC in which beam reporting is performed becomes an unknown TCI state in a CC in which beam reporting is not performed.

Thus, when a known/unknown condition varies for each CC, delay time necessary for TCI state switching/activation for each CC varies, and communication quality reduction, throughput reduction, and the like may occur.

Figure 3:
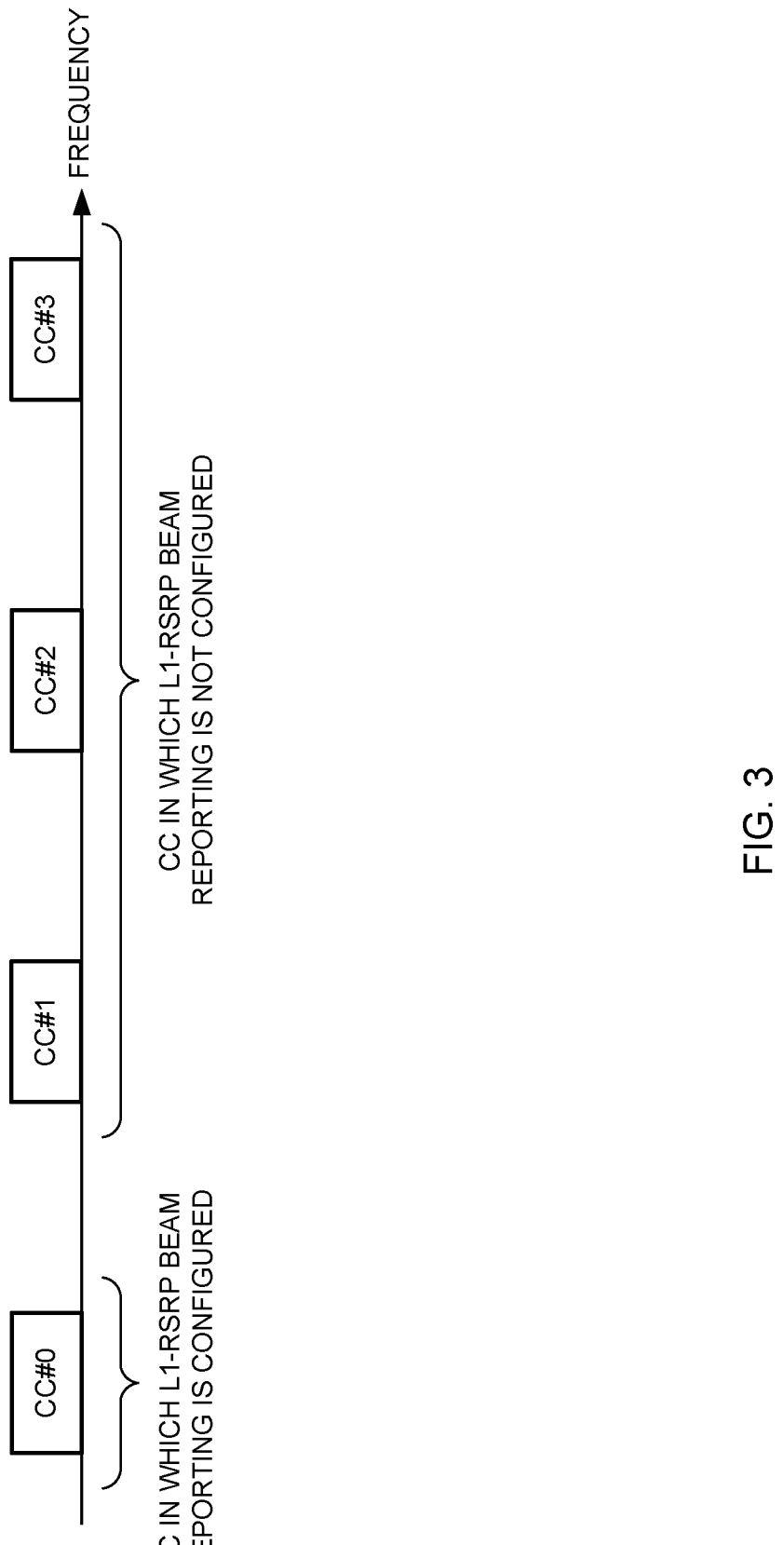
FIG. 3 is a diagram to show an example of beam report configuration for a plurality of CCs.

FIG. 3 is a diagram to show an example of beam report configuration for a plurality of CCs. In the example shown in FIG. 3, L1-RSRP beam reporting is configured in CC #0, and L1-RSRP beam reporting is not configured in CC #1 to CC #3. In such an example as shown in FIG. 3, a TCI state indicated for the UE in CC #0 is a TCI state based on the latest beam reporting, and the TCI state is a known TCI state, thereby reducing delay time necessary for TCI state switching/activation.

On the other hand, beam reporting is not performed in CC #1 to CC #3, and thus there is a possibility that a TCI state known in CC #0 becomes an unknown TCI state in CC #1 to CC #3. In this case, delay time necessary for TCI state switching/activation is not reduced in CC #1 to CC #3, thereby causing delay time necessary for TCI state switching/activation in CC #0 to differ from that in CC #1 to CC #3.

Thus, the inventors of the present invention came up with the idea of a method for determining delay time necessary for TCI state switching for solving the above-described challenge.

Embodiments according to the present disclosure will be described in detail with reference to the drawings as follows.

The radio communication methods according to respective embodiments may each be employed individually, or may be employed in combination.

Note that in the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support," "control," "controllable," "operate," and "operable" may be interchangeably interpreted.

In the present disclosure, configure, activate, update, indicate, enable, specify, select, and switch may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, and a DL-RS, a DL-RS source, an SSB, a CSI-RS, or an SRS having QCL type X may be interchangeably interpreted.

UL DCI, DCI to schedule a UL channel (for example, a PUSCH), and DCI format 0_x (x=0, 1, 2, . . . ) may be interchangeably interpreted. DL DCI, DCI to schedule a DL channel (PDSCH), and DCI format 1_x (x=0, 1, 2, . . . ) may be interchangeably interpreted.

In the present disclosure, HARQ-ACK information, an ACK, and a NACK may be interchangeably interpreted.

In the present disclosure, a pool, a set, a group, a list, and candidates may be interchangeably interpreted.

In the present disclosure, a beam, a spatial domain filter, a spatial setting, a TCI state, a UL TCI state, a unified TCI state, a unified beam, a common TCI state, a TCI state for a PDCCH DMRS, a TCI state for a PDSCH DMRS, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, and a DL-RS, a DL-RS source, an SSB, a CSI-RS, or an SRS having QCL type X may be interchangeably interpreted.

In the present disclosure, a panel, an Uplink (UL) transmission entity, a point, a TRP, a spatial relation, a control resource set (Control REsource SET (CORESET)), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP index, a TRP ID, a CORESET pool index, an ordinal number (first or second) of a TCI state in two TCI states, and a TRP may be interchangeably interpreted.

Respective embodiments of the present disclosure are also appropriately employable in common/unified TCI state switching/activation.

(Radio Communication Method)

In the present disclosure, a signaling structure, signaling, configuration, a structure, configuration information, indication, indication information, and the like may be interchangeably interpreted. In the present disclosure, store, hold, retain, and the like may be interchangeably interpreted.

In each embodiment of the present disclosure, a QCL property may mean information related to a specific QCL type. The specific QCL type may be QCL type D, or may be a QCL type other than that.

First Embodiment

In a first embodiment, a method for holding/storing a QCL property will be described.

Embodiment 1-1

A UE may store a QCL property of a subset of RSs (one or more RSS).

Storing of the QCL property may be configured/indicated for the UE. For example, the UE may receive configuration information/indication information to configure/indicate the storing of the QCL property.

For example, when storing of the QCL property is configured/indicated for the UE, the UE may perform measurement/storing related to a QCL property of a QCL source RS. For example, the QCL source RS may be a QCL type D source RS in a PDCCH/PDSCH TCI state, or may be an SSB/CSI-RS. In the present disclosure, the QCL source RS may be referred to as a root SSB, a QCL source SSB, or a source SSB.

When a TCI state (for example, a TCI state/common TCI state for a PDCCH/PDSCH DMRS) is known, the UE may measure/store a QCL property related to the TCI state. When the TCI state is unknown, it may not be necessary (mandatory) for the UE to measure/store the QCL property related to the TCI state.

Figure 4:
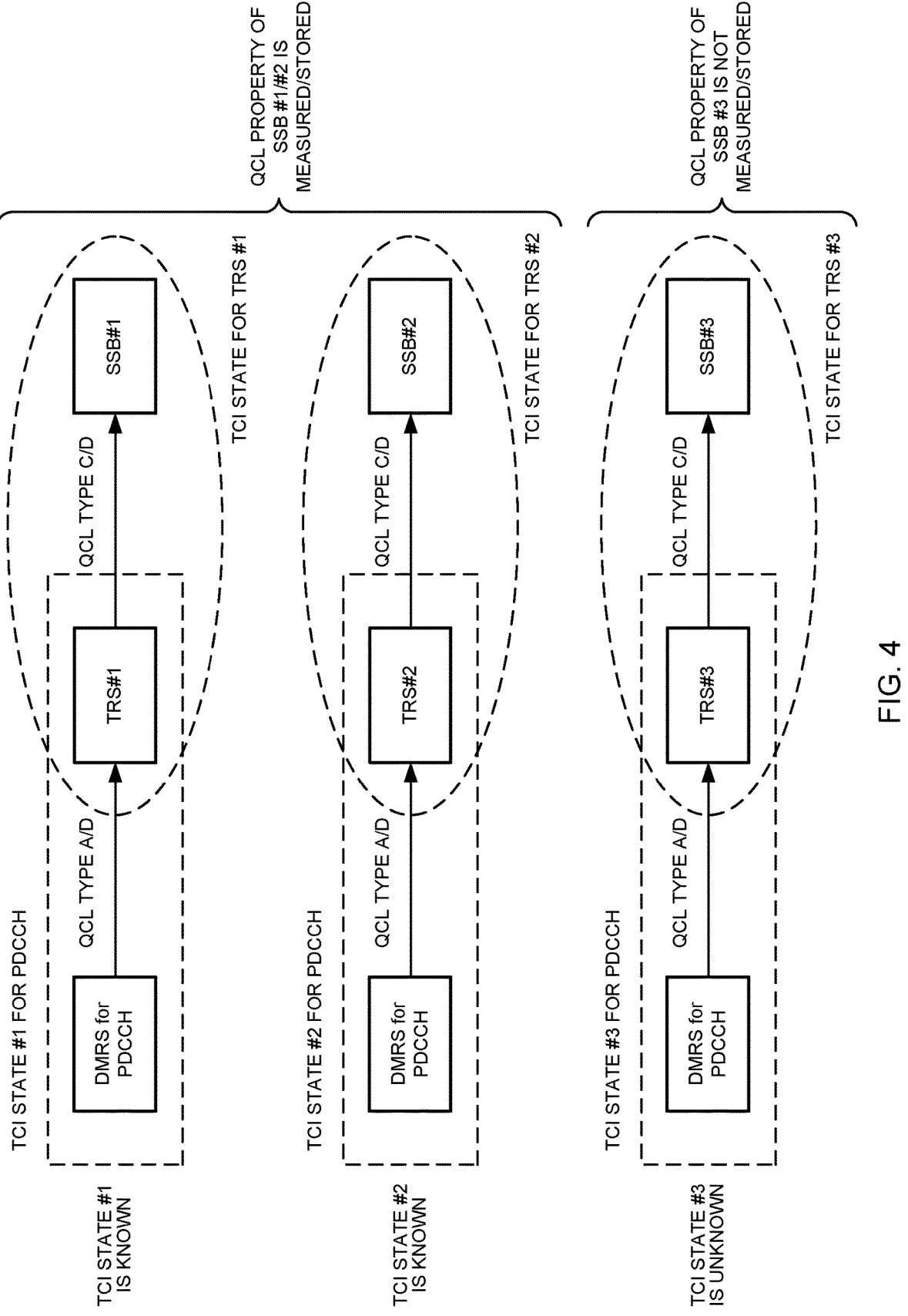
FIG. 4 is a diagram to show an example of storing of a QCL property according to Embodiment 1-1.

FIG. 4 is a diagram to show an example of storing of the QCL property according to Embodiment 1-1. In FIG. 4, TCI state #1 to TCI state #3 being active TCI states are configured for the UE. Here, TCI state #1 and TCI state #2 are known TCI states, and TCI state #3 is an unknown TCI state.

In FIG. 4, the UE measures/stores respective a QCL property of SSB #1 being a QCL source RS in TCI state #1 being a known TCI state, and a QCL property of SSB #2 being a QCL source RS in TCI state #2. On the other hand, it is unnecessary for the UE to measure/store a QCL property of SSB #3 being a QCL source RS in TCI state #3 being an unknown TCI state.

Note that an example in which it is unnecessary to store a QCL property related to an unknown TCI state is described above, but the UE may perform storing of the QCL property related to the unknown TCI state.

According to Embodiment 1-1, it is possible to appropriately perform storing of a QCL property related to a TCI state.

Embodiment 1-2

In Embodiment 1-2, a method for configuring/indicating storing of a QCL property for a UE will be described. Storing of the QCL property may be configured/indicated for the UE on the basis of at least one of Embodiment 1-2-1 to Embodiment 1-2-5 below.

Embodiment 1-2-1

The UE may receive configuration information related to storing of a QCL property by using higher layer signaling (RRC signaling).

The configuration information related to the storing of the QCL property may be a parameter (for example, enableQCLStore) for configuration (enabling) related to storing of a QCL property included in a specific RRC information element. In at least one of a case where the parameter is configured and a case where the parameter is configured to be enabled, the UE may judge that a QCL property related to a TCI state is stored.

Storing of the QCL property for each CC/BWP/UE/band may be configured for the UE. In other words, the configuration information may be configured for each CC/BWP/UE/band.

Storing of the QCL property for a plurality of CCs, a plurality of BWPs, a plurality of UEs, or a plurality of bands may be configured for the UE. In other words, the configuration information may be configured for a plurality of CCs, a plurality of BWPs, a plurality of UEs, or a plurality of bands.

Embodiment 1-2-2

The UE may receive configuration information related to storing of a QCL property. The configuration information may be information related to the number of reports of power/quality of a measured signal (for example, L1-RSRP/L1-SINR).

For example, the UE may store a QCL property of a QCL source RS (root SSB) related to X (X in an integer, for example, 1, 2, or 4) higher-order beams (CSI-RS resource indicators (CRIs)/SSB resource indicators (SSBRIs)) in L1-RSRP/L1-SINR reporting.

X described above may be defined in specifications beforehand, or may be configured for the UE by using higher layer signaling. X described above may be less than or equal to the number of beam (CRI/SSBRI) reports in L1-RSRP/L1-SINR. X described above may be the same value as the number of beam (CRI/SSBRI) reports in L1-RSRP/L1-SINR.

X described above for each CC/BWP/UE/band may be configured for the UE. In other words, X described above may be configured for each CC/BWP/UE/band.

X described above for a plurality of CCs, a plurality of BWPs, a plurality of UEs, or a plurality of bands may be configured for the UE. In other words, X described above may be configured for a plurality of CCs, a plurality of BWPs, a plurality of UEs, or a plurality of bands.

Embodiment 1-2-2 may be employed in at least one of a case where a higher layer parameter described in Embodiment 1-2-1 described above is configured and a case where X described above is configured.

According to Embodiment 1-2-2, the number of QCL properties to be stored can be limited, and thus a memory burden on the UE can be reduced.

Embodiment 1-2-3

The UE may receive, by using RRC signaling/MAC CE, information to indicate a TCI state related to a QCL property to be stored. On the basis of the information to indicate the TCI state, the QCL property to be stored may be configured/indicated for the UE.

For example, the information to indicate the TCI state may be a list including one or more TCI state IDs. For example, the UE may judge that a QCL property of a root SSB in a TCI state included in the list is stored. For example, a list of TCI state IDs for configuring/indicating storing of QCL properties is configured for the UE, and the list includes TCI state #1, TCI state #20, TCI state #35, and TCI state #51. In this case, the UE measures/stores QCL properties of root SSBs in TCI state #1, TCI state #20, TCI state #35, and TCI state #51.

Note that the above-described information to indicate the TCI state may be configured for each CC/BWP/UE/band, or may be configured for a plurality of CCs, a plurality of BWPs, a plurality of UEs, or a plurality of bands.

According to Embodiment 1-2-3, it is possible to flexibly indicate storing of a QCL property.

Embodiment 1-2-4

The UE may receive, by using RRC signaling/MAC CE, information to indicate a TCI state related to a QCL property to be stored. On the basis of the information to indicate the TCI state, the QCL property to be stored may be configured/indicated for the UE.

For example, the information to indicate the TCI state may be a list including one or more RS IDs. The RS IDs may be SSB IDs. For example, the UE may judge that a QCL property of an SSB corresponding to an SSB ID included in the list is stored.

For example, a list of SSB IDs for configuring/indicating storing of QCL properties is configured for the UE, and the list includes SSB #1, SSB #20, SSB #35, and SSB #51. In this case, the UE measures/stores QCL properties of SSBs corresponding to SSB #1, SSB #20, SSB #35, and SSB #51.

The RS IDs may be TRS IDs/CSI-RS IDs. For example, the UE may judge that a QCL property of a root SSB for a TRS/CSI-RS corresponding to a TRS ID/CSI-RS ID included in the list is stored.

For example, a list of TRS IDs for configuring/indicating storing of QCL properties is configured for the UE, and the list includes TRS #1, TRS #20, TRS #35, and TRS #51. In this case, the UE measures/stores QCL properties of root SSBs for TRSs corresponding to respective TRS #1, TRS #20, TRS #35, and TRS #51.

Note that the above-described information to indicate the TCI state may be configured for each CC/BWP/UE/band, or may be configured for a plurality of CCs, a plurality of BWPs, a plurality of UEs, or a plurality of bands.

According to Embodiment 1-2-4, it is possible to flexibly indicate storing of a QCL property.

Embodiment 1-2-5

The UE may receive, by using RRC signaling/MAC CE, information to indicate a TCI state related to a QCL property to be stored. On the basis of the information to indicate the TCI state, the QCL property to be stored may be configured/indicated for the UE.

For example, the information to indicate the TCI state may be a list including one or more CORESET IDs. The UE may judge that a QCL property of a root SSB in a TCI state for a CORESET corresponding to a CORESET ID included in the list is stored.

For example, a list of CORESET IDs for configuring/indicating storing of QCL properties is configured for the UE, and the list includes CORESET #1 and CORESET #2. In this case, the UE measures/stores QCL properties of root SSBs in TCI states for CORESETs corresponding to respective CORESET #1 and CORESET #2.

Note that the above-described information to indicate the TCI state may be configured for each CC/BWP/UE/band, or may be configured for a plurality of CCs, a plurality of BWPs, a plurality of UEs, or a plurality of bands.

According to Embodiment 1-2-5, it is possible to flexibly indicate storing of a QCL property.

According to above Embodiment 1-2, it is possible to appropriately perform configuration/indication of storing of a QCL property related to a TCI state.

Embodiment 1-3

In Embodiment 1-3, a method for controlling delay time related to TCI state switching will be described. When measurement/storing of a QCL property related to a root SSB in a TCI state is performed in a UE, the delay time related to the TCI state switching may be determined.

The UE may determine, on the basis of whether a QCL property of the root SSB in the TCI state is measured/stored, whether delay time related to a standby for SSB reception (for example, $TO_k*(T_{first-SSB}+T_{SSB-proc})/(NR$ slot length)) out of delay time related to TCI state switching/activation is added, that is, whether $TO_k$ becomes 0 or 1.

For example, when the QCL property of the root SSB in the TCI state is measured/stored, the UE may judge that $TO_k$ is 0. When the QCL property of the root SSB in the TCI state is not stored, the UE may judge that $TO_k$ is 1.

Embodiment 1-3-1

The UE may receive configuration information related to storing of a QCL property. The UE may judge, on the basis of whether the configuration information related to the storing of the QCL property is configured, whether the delay time related to the standby for SSB reception is added.

For example, when a parameter (for example, enableQCLStore) for configuration related to storing of a QCL property included in a specific RRC information element is not configured, and a list of active TCI states for a PDSCH does not include a target TCI state, the UE may judge that the delay time related to the standby for SSB reception is added. For example, when the parameter for configuration related to the storing of the QCL property included in the specific RRC information element is not configured, and the list of active TCI states for the PDSCH does not include the target TCI state, the UE may judge that $TO_k$ is 1. Otherwise (for example, when the parameter (for example, enableQCLStore) for configuration related to the storing of the QCL property included in the specific RRC information element is configured), the UE may judge that the delay time related to the standby for SSB reception is not added ($TO_k$ is 0).

Note that Embodiment 1-3-1 may be employed in a case where Embodiment 1-2-1 described above is employed.

Embodiment 1-3-2

The UE may receive configuration information related to storing of a QCL property. The configuration information may be information related to the number (for example, X described above) of reports of power/quality of a measured signal (for example, L1-RSRP/L1-SINR).

For example, the UE may perform reporting of X higher-order beams (CRIs/SSBRIs) in L1-RSRP/L1-SINR reporting, and may store a QCL property of a root SSB in a TCI state related to the reported beam. When the target TCI state is not included in the TCI state related to the stored QCL property, and the list of active TCI states for the PDSCH does not include the target TCI state, the UE may judge that the delay time related to the standby for SSB reception is added. For example, when the target TCI state is not included in the TCI state related to the stored QCL property, and the list of active TCI states for the PDSCH does not include the target TCI state, the UE may judge that $TO_k$ is 1. Otherwise (for example, when the target TCI state is included in the TCI state related to the stored QCL property), the UE may judge that the delay time related to the standby for SSB reception is not added ($TO_k$ is 0).

Note that Embodiment 1-3-2 may be employed in a case where at least one of Embodiment 1-2-1 and Embodiment 1-2-2 described above is employed.

Embodiment 1-3-3

The UE may receive, by using RRC signaling/MAC CE, information (for example, a TCI state ID) to indicate a TCI state related to a QCL property to be stored, and may store a QCL property of a root SSB in the TCI state on the basis of the information. The UE may judge, on the basis of whether the target TCI state is included in the TCI state related to the stored QCL property, whether the delay time related to the standby for SSB reception is added.

For example, when the target TCI state is not included in the TCI state related to the stored QCL property, and the list of active TCI states for the PDSCH does not include the target TCI state, the UE may judge that the delay time related to the standby for SSB reception is added. For example, when the target TCI state is not included in the TCI state related to the stored QCL property, and the list of active TCI states for the PDSCH does not include the target TCI state, the UE may judge that $TO_k$ is 1. Otherwise (for example, when the target TCI state is included in the TCI state related to the stored QCL property), the UE may judge that the delay time related to the standby for SSB reception is not added ($TO_k$ is 0).

Note that Embodiment 1-3-3 may be employed in a case where Embodiment 1-2-3 described above is employed.

Embodiment 1-3-4

The UE may receive, by using RRC signaling/MAC CE, information (for example, an RS ID related to a TCI state) to indicate a TCI state related to a QCL property to be stored, and may store a QCL property of a related SSB on the basis of the information. The UE may judge, on the basis of whether the target TCI state is included in the TCI state related to the stored QCL property, whether the delay time related to the standby for SSB reception is added.

For example, when a QCL property in the target TCI state is not included in the stored QCL property, and the list of active TCI states for the PDSCH does not include the target TCI state, the UE may judge that the delay time related to the standby for SSB reception is added. For example, when the QCL property in the target TCI state is not included in the stored QCL property, and the list of active TCI states for the PDSCH does not include the target TCI state, the UE may judge that $TO_k$ is 1. Otherwise (for example, when the QCL property in the target TCI state is included in the stored QCL property), the UE may judge that the delay time related to the standby for SSB reception is not added ($TO_k$ is 0).

Note that Embodiment 1-3-4 may be employed in a case where Embodiment 1-2-4 described above is employed.

Embodiment 1-3-5

The UE may receive, by using RRC signaling/MAC CE, information (for example, a CORESET ID) to indicate a TCI state related to a QCL property to be stored, and may store a QCL property of a root SSB in the TCI state on the basis of the information. The UE may judge, on the basis of whether the target TCI state is included in the TCI state related to the stored QCL property, whether the delay time related to the standby for SSB reception is added.

For example, when the target TCI state is not included in the TCI state related to the stored QCL property, and the list of active TCI states for the PDSCH does not include the target TCI state, the UE may judge that the delay time related to the standby for SSB reception is added. For example, when the target TCI state is not included in the TCI state related to the stored QCL property, and the list of active TCI states for the PDSCH does not include the target TCI state, the UE may judge that $TO_k$ is 1. Otherwise (for example, when the target TCI state is included in the TCI state related to the stored QCL property), the UE may judge that the delay time related to the standby for SSB reception is not added (TO) is 0).

Note that Embodiment 1-3-5 may be employed in a case where Embodiment 1-2-5 described above is employed.

According to above Embodiment 1-3, with storing of a QCL property, it is possible to appropriately perform reduction of delay time related to TCI state switching/activation.

Second Embodiment

In a second embodiment, TCI state activation/switching based on an RS (for example, a CSI-RS/TRS) other than an SSB will be described. Note that in the present disclosure, the TCI state activation/switching may mean determination of a spatial domain filter applied to transmission/reception of a signal/channel.

A UE may acquire a QCL property by measuring the RS (for example, the CSI-RS/TRS) other than the SSB without SSB reception or before SSB reception. Even when the UE can acquire the QCL property by measuring the RS (for example, the CSI-RS/TRS) other than the SSB, the UE may perform the storing of the QCL property of the SSB described in the above-described first embodiment.

A capability indicating whether to support QCL property acquisition based on measurement of the RS (for example, the CSI-RS/TRS) other than the SSB may be defined. When reporting, to a NW, a case that the capability is supported (capability information), the UE may assume that delay time related to a standby for SSB reception (for example, $TO_k^*$ ($T_{first\text{-}SSB}+T_{SSB\text{-}proc}$)/(NR slot length)) out of delay time related to TCI state switching/activation is not added (that is, $TO_k$ is 0).

The UE may judge addition of the delay time related to the standby for SSB reception on the basis of whether a parameter (for example, tciActivationWithoutSSB) for configuring TCI state activation/switching based on measurement of the RS (for example, the CSI-RS/TRS) other than the SSB is configured from the NW.

For example, when the parameter (for example, tciActivationWithoutSSB) for configuring the TCI state activation/switching based on measurement of the RS (for example, the CSI-RS/TRS) other than the SSB is not configured, and a list of active TCI states for a PDSCH does not include a target TCI state, the UE may judge that the delay time related to the standby for SSB reception is added. For example, when the parameter (for example, tciActivationWithoutSSB) for configuring the TCI state activation/switching based on measurement of the RS (for example, the CSI-RS/TRS) other than the SSB is not configured, and the list of active TCI states for the PDSCH does not include the target TCI state, the UE may judge that $TO_k$ is 1. Otherwise (for example, when the parameter (for example, tciActivationWithoutSSB) for configuring the TCI state activation/switching based on measurement of the RS (for example, the CSI-RS/TRS) other than the SSB is configured), the UE may judge that the delay time related to the standby for SSB reception is not added ($TO_k$ is 0).

According to the above second embodiment, TCI state activation/switching based on an RS other than an SSB is performed, thereby allowing delay time necessary for TCI state activation/switching to be reduced.

Third Embodiment

In a third embodiment, a UE may report/transmit information related to a known TCI state to a NW. The information related to the known TCI state may be information (for example, a list) including a TCI state ID of the known TCI state/RS ID of the known TCI state.

Embodiment 3-1

The UE may transmit information related to a TCI state by using a MAC CE.

The MAC CE for the information related to the TCI state may include a cell ID, a BWP ID, and one or more TCI state IDs/RS IDs. The TCI state IDs/RS IDs may be TCI state IDs/RS IDs corresponding to the known TCI state. Note that the number of TCI state IDs/RS IDs included in the MAC CE may be variable.

When reporting/transmitting the information related to the TCI state, the UE may assume that delay time related to TCI state switching/activation is configured such that the delay time is shorter as compared to delay time defined in Rel. 16 (or earlier versions). Specifically, when reporting/transmitting the information related to the TCI state, the UE may assume that the delay time related to the TCI state switching/activation does not include time (for example, $T_{L1\text{-}RSRP}$) related to received power measurement.

For example, when performing beam reporting based on received power/quality (for example, L1-RSRP/L1-SINR), the UE may not perform transmission/reporting of information (TCI state ID/RS ID) related to a TCI state/RS related to a beam for which the beam reporting is performed.

The UE may transmit the MAC CE by including, in the MAC CE, only a TCI state ID/RS ID corresponding to the known TCI state. The NW may judge that a TCI state corresponding to a TCI state ID/RS ID not included in the MAC CE is an unknown TCI state.

The UE may transmit the MAC CE by including, in the MAC CE, only a TCI state ID/RS ID corresponding to the unknown TCI state. The NW may judge that a TCI state corresponding to a TCI state ID/RS ID not included in the MAC CE is the known TCI state.

The UE may transmit the MAC CE by including, in the MAC CE, a TCI state ID/RS ID corresponding to the known TCI state and a TCI state ID/RS ID corresponding to the unknown TCI state.

The MAC CE may include a field indicating whether a TCI state is the known TCI state or the unknown TCI state.

Figure 5:
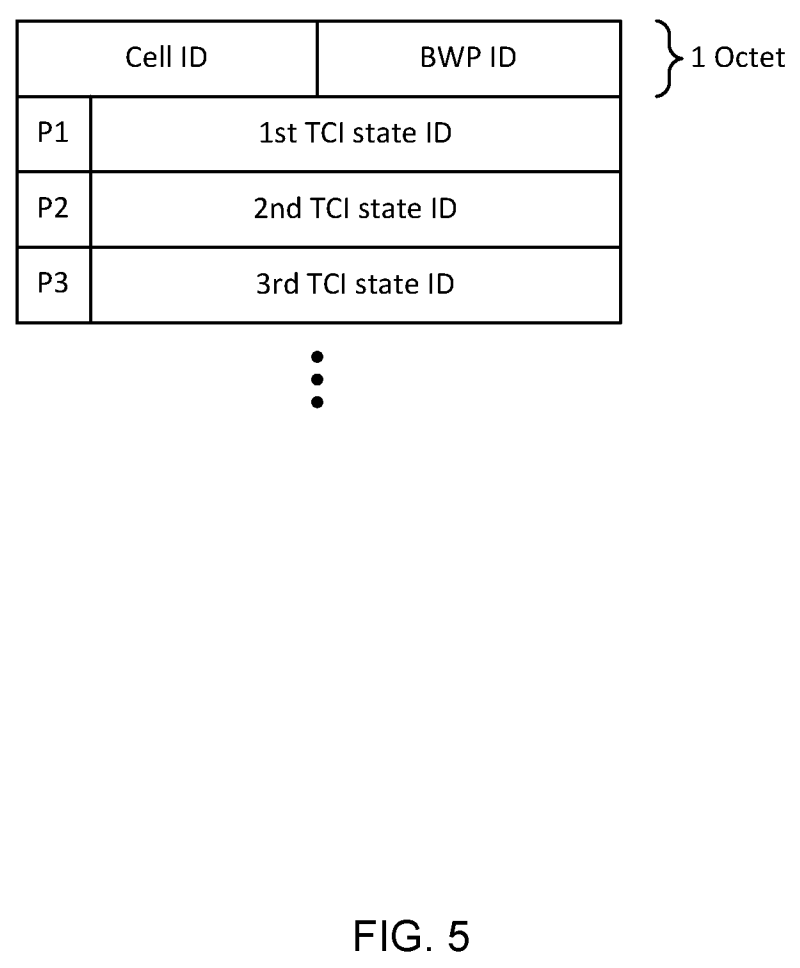

FIG. 5 is a diagram to show an example of the MAC CE according to Embodiment 3-1. In the example shown in FIG. 5, the MAC CE includes a bit field indicating a cell ID, a bit field indicating a BWP ID, one or more bit fields indicating a TCI state ID, and one or more bit fields (P1, P2, . . . ) indicating the presence of a corresponding TCI state. When a bit field indicating a TCI state ID is present, the UE sets, to a specific value (for example, 1), a bit field indicating the presence of a corresponding TCI state.

Note that a structure of the MAC CE shown in FIG. 5 is just an example, and sizes, positions, and the numbers of the respective fields are not limited to this. For example, a reserved bit may be included in an arbitrary position in the MAC CE of the present embodiment.

Variation of Embodiment 3-1

In Embodiment 3-1 mentioned above, a case where the MAC CE includes a field indicating a TCI state ID/RS ID is described, but the MAC CE may include a bit field indicating whether a root SSB (QCL property of the root SSB) has been measured/stored.

According to this method, a case that delay time related to a standby for SSB reception is not added (that is, at least one of $TO_k$ and $TO_{uk}$ is 0) can be indicated to the NW, and thus delay time necessary for TCI state activation/switching can be reduced.

Note that a MAC CE including the field indicating the TCI state ID/RS ID and a MAC CE including the field indicating whether the root SSB (QCL property of the root SSB) has been measured/stored may be different MAC CEs.

The field indicating the TCI state ID/RS ID and the field indicating whether the root SSB (QCL property of the root SSB) has been measured/stored may be included in the same MAC CE. In this case, the MAC CE may include a field indicating whether a TCI state corresponding to the TCI state ID/RS ID is a known TCI state or an unknown TCI state.

Embodiment 3-2

The UE may transmit information related to a TCI state by using uplink control information (UCI). For example, the UE may transmit the information related to the TCI state by using UCI for performing beam reporting.

The beam reporting may be beam reporting using L1-RSRP/L1-SINR, or may be beam reporting using CSI. The information related to the TCI state may be a TCI state ID of a known TCI state.

For example, when reporting of the TCI state ID of the known TCI state is configured/indicated for the UE, the UE may report/transmit, by using the UCI, one or more TCI state IDs of the known TCI state as part of the beam reporting.

It is necessary that recognition of the number (size) of bits of the UCI by the UE and recognition of the number of bits of the UCI by the NW are equal to each other. The NW may configure the number of TCI state IDs, or may configure the number of UCI bits. The UE may drop, on the basis of the number of bits of the UCI indicated from the NW, a TCI state ID to be included in the UCI. For example, when the number of bits of the UCI including a TCI state ID transmitted by the UE is greater than the number of bits of the UCI indicated from the NW, the UE may drop bit information of the TCI state ID so that the number of bits is equal to the indicated number of bits. For the drop in the bit information, the bit information may be selected by the UE in order starting from that with the lowest received power/quality (for example, L1-RSRP/L1-SINR). When the number of bits of the UCI including the TCI state ID transmitted by the UE is less than the number of bits of the UCI indicated from the NW, the UE may perform padding for the number of bits by using a specific value (for example, 0) so that the number of bits is equal to the indicated number of bits.

A number of beam reports greater than a specific number (for example, 4) may be configured/indicated for the UE.

In this case, the UE may report the configured/indicated number of beam indexes (for example, SSB indexes/CSI-RS indexes) and the configured/indicated number of measured received power/quality values (for example, L1-RSRP/L1-SINR values) in a manner similar to operation defined in Rel. 15/16. The measured received power/quality values (for example, L1-RSRP/L1-SINR values) may have a specific number (for example, 4) of bits for each beam.

The UE may report measured received power/quality values (for example, L1-RSRP/L1-SINR values) of a specific number (for example, four) of beams and a beam index (for example, an SSBRI/CRI, without a measured received power/quality value) of a remaining beam. According to this, the number of bits of UCI can be reduced.

Variation of Embodiment 3-2

In Embodiment 3-2 mentioned above, a case where UCI includes a TCI state ID is described, but the UCI may include information indicating whether a root SSB (QCL property of the root SSB) has been measured/stored.

According to this method, a case that delay time related to a standby for SSB reception is not added (that is, $TO_k/TO_{uk}$ is 0) can be indicated to the NW, and thus delay time necessary for TCI state activation/switching can be reduced.

According to the above third embodiment, delay time related to received power/quality measurement can be reduced, and delay time necessary for TCI state activation/switching can be reduced.

Fourth Embodiment

Embodiment 4-1

For reduction of delay time related to a standby for SSB reception, aperiodic triggering/measurement/transmission of an SSB may be supported. A UE may perform TCI state switching/activation on the basis of aperiodic SSB measurement.

The UE may receive a higher layer parameter to configure/enable the aperiodic triggering/measurement/transmission of the SSB. When the higher layer parameter has been configured, the UE may perform TCI state switching/activation on the basis of the SSB.

For example, in TCI state switching based on a MAC CE/RRC, aperiodic triggering/measurement/transmission of an SSB (root SSB) being in a relationship of a specific QCL type (for example, QCL type A/QCL type C) with a target TCI state may be used. The UE may judge that the aperiodic triggering/measurement/transmission of the SSB is performed on the basis of information included in the MAC CE/RRC to configure/indicate the TCI state switching.

The UE may receive information indicating aperiodic triggering/measurement/transmission (reception) of an SSB by using a MAC CE/DCI. For example, the MAC CE to indicate TCI state activation/update may include a field indicating the aperiodic triggering/measurement/transmission of the SSB, or a MAC CE different from the MAC CE to indicate the TCI state activation/update may include the field indicating the aperiodic triggering/measurement/transmission of the SSB. For example, the DCI to indicate TCI state activation/update may include a field indicating the aperiodic triggering/measurement/transmission of the SSB, or DCI (DCI format) different from the DCI (DCI format) to indicate the TCI state activation/update may include the field indicating the aperiodic triggering/measurement/transmission of the SSB.

According to Embodiment 4-1, delay time related to a standby for SSB reception can be reduced without changing a transmission periodicity of an SSB.

Embodiment 4-2

For reduction of delay time related to received power measurement (for example, $T_{L1-RSRP}$), when TCI state switching based on a MAC CE/TCI state switching based on RRC is performed, triggering of aperiodic beam reporting corresponding to an SSB/CSI-RS related to a target TCI state may be performed by using the MAC CE/RRC to configure/indicate the switching. A higher layer parameter related to the triggering of the aperiodic beam reporting may be defined.

The triggering of the aperiodic beam reporting corresponding to the SSB/CSI-RS related to the target TCI state may be configured/indicated for the UE on the basis of information included in the MAC CE/RRC to indicate the TCI state switching.

For example, in a period (for example, a slot) used for transmission of a HARQ-ACK (ACK/NACK) for a MAC CE to indicate TCI state activation, the UE may transmit UCI to communicate aperiodic beam reporting for received power/quality (for example, L1-RSRP/L1-SINR) corresponding to the SSB/CSI-RS.

According to an above fourth embodiment, delay time related to received power measurement can be reduced without shortening a transmission periodicity of an SSB.

Fifth Embodiment

In a fifth embodiment, a method for determining delay time necessary for TCI state switching/activation in a case where CA is used will be described.

Even in a case where beam reporting (for example, L1-RSRP/L1-SINR beam reporting) is not configured in a certain CC (even if a TCI state/RS in the certain CC is unknown), when a QCL source RS (root SSB) in the TCI state/RS is a root SSB in a known TCI state, the UE can acquire a QCL property corresponding to the TCI state/RS in the CC (for example, spatial domain filter information acquired by at least QCL type D).

That is, the UE may judge that when a root SSB in a certain TCI state in a CC in which beam reporting is not configured is the same as a root SSB in a known TCI state, the TCI state in the CC in which the beam reporting is not configured is known.

In this case, delay time related to received power measurement (for example, $T_{L1-RSRP}$) out of delay time necessary for TCI state switching/activation in the CC may be reduced (for example, $T_{L1-RSRP}$ may become 0). In this case, the delay time necessary for the TCI state switching/activation in the CC may be equal to the delay time necessary for the TCI state switching/activation in a CC in which beam reporting is configured.

For example, assume that a certain CSI-RS/TRS is configured as a QCL type D RS in a TCI state for a PDCCH in CC #x and that SSB #1 (root SSB) in CC #x is configured as a QCL type D RS in a TCI state for the CSI-RS/TRS. Assume that another CSI-RS/TRS is configured as a QCL type D RS in a TCI state for a PDCCH in CC #y and that SSB #1 (same root SSB) in CC #x is configured as a QCL type D RS in a TCI state for such another CSI-RS/TRS. In this case, when the TCI state for the PDCCH in CC #x is known, the UE may judge/assume that the TCI state for the PDCCH in CC #y is also known.

Note that as described in the present embodiment, control of delay time necessary for TCI state switching/activation in a CC in which beam reporting is not configured may be applied to a case where a specific higher layer (RRC) parameter (for example, tciActivationRootSSB) is configured.

Figure 6:
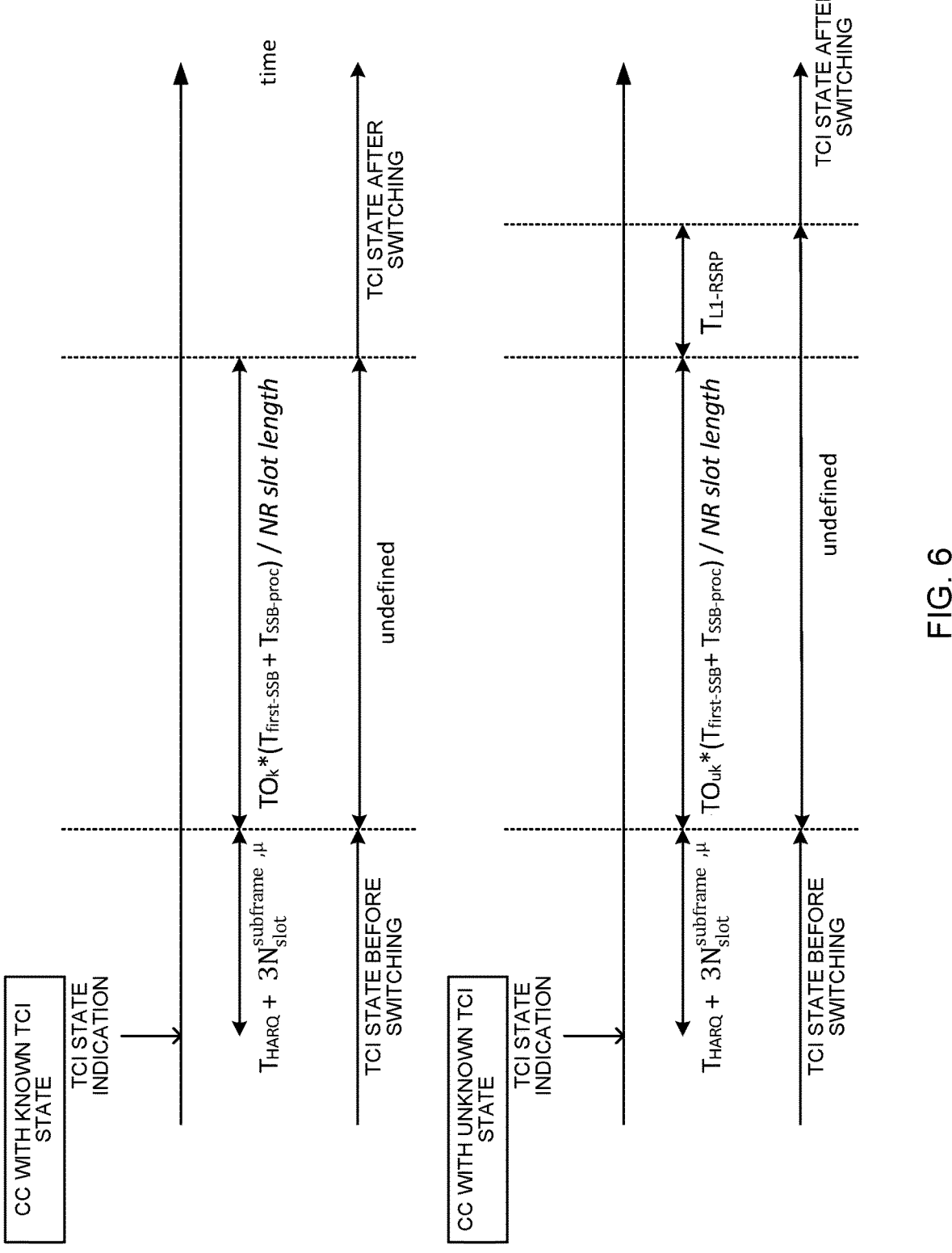
FIG. 6 is a diagram to show an example of a timeline for TCI state switching/activation in a certain CC defined in Rel. 15/16 (or earlier versions).

FIG. 6 is a diagram to show an example of a timeline for TCI state switching/activation in the certain CC defined in Rel. 15/16 (or earlier versions). In the example shown in FIG. 6, in the CC with a known TCI state, the TCI state switching/activation is performed after $T_{HARQ}+3N^{subframe,\mu}_{slot}+TO_k*(T_{first-SSB}+T_{SSB-proc})/(NR$ slot length) from reception of a TCI state activation command (TCI state indication). The UE applies a previous TCI state (before the switching) until $T_{HARQ}+3N^{subframe,\mu}_{slot}$ from after the reception of the TCI transmission indication. In a period from $T_{HARQ}+3N^{subframe,\mu}_{slot}$ after the reception of the TCI transmission indication until $T_{HARQ}+3N^{subframe,\mu}_{slot}+TO_k*(T_{first-SSB}+T_{SSB-proc})/(NR$ slot length) after the reception of the TCI transmission indication, a TCI state applied by the UE is undefined.

In the example shown in FIG. 6, in the CC with an unknown TCI state, the TCI state switching/activation is performed after $T_{HARQ}+3N^{subframe,\mu}_{slot}+T_{L1\text{-}RSRP}+TO_{uk}*$ $(T_{first\text{-}SSB}+T_{SSB\text{-}proc})/(NR\ slot\ length)$ from reception of a TCI state activation command (TCI state indication). The UE applies a previous TCI state (before the switching) until $T_{HARQ}+3N^{subframe,\mu}_{slot}$ from after the reception of the TCI transmission indication. In a period from $T_{HARQ}+3N^{subframe,\mu}_{slot}$ after the reception of the TCI transmission indication until $T_{HARQ}+3N^{subframe,\mu}_{slot}+T_{L1\text{-}RSRP}+TO_{uk}*$ $(T_{first\text{-}SSB}+T_{SSB\text{-}proc})/(NR\ slot\ length)$ after the reception of the TCI transmission indication, a TCI state applied by the UE is undefined. As described with respect to such an example as shown in FIG. 6, in an existing timeline, delay time for TCI state switching/activation in a CC correspond-ing to a known TCI state is different from that in a CC corresponding to an unknown TCI state.

Figure 7:
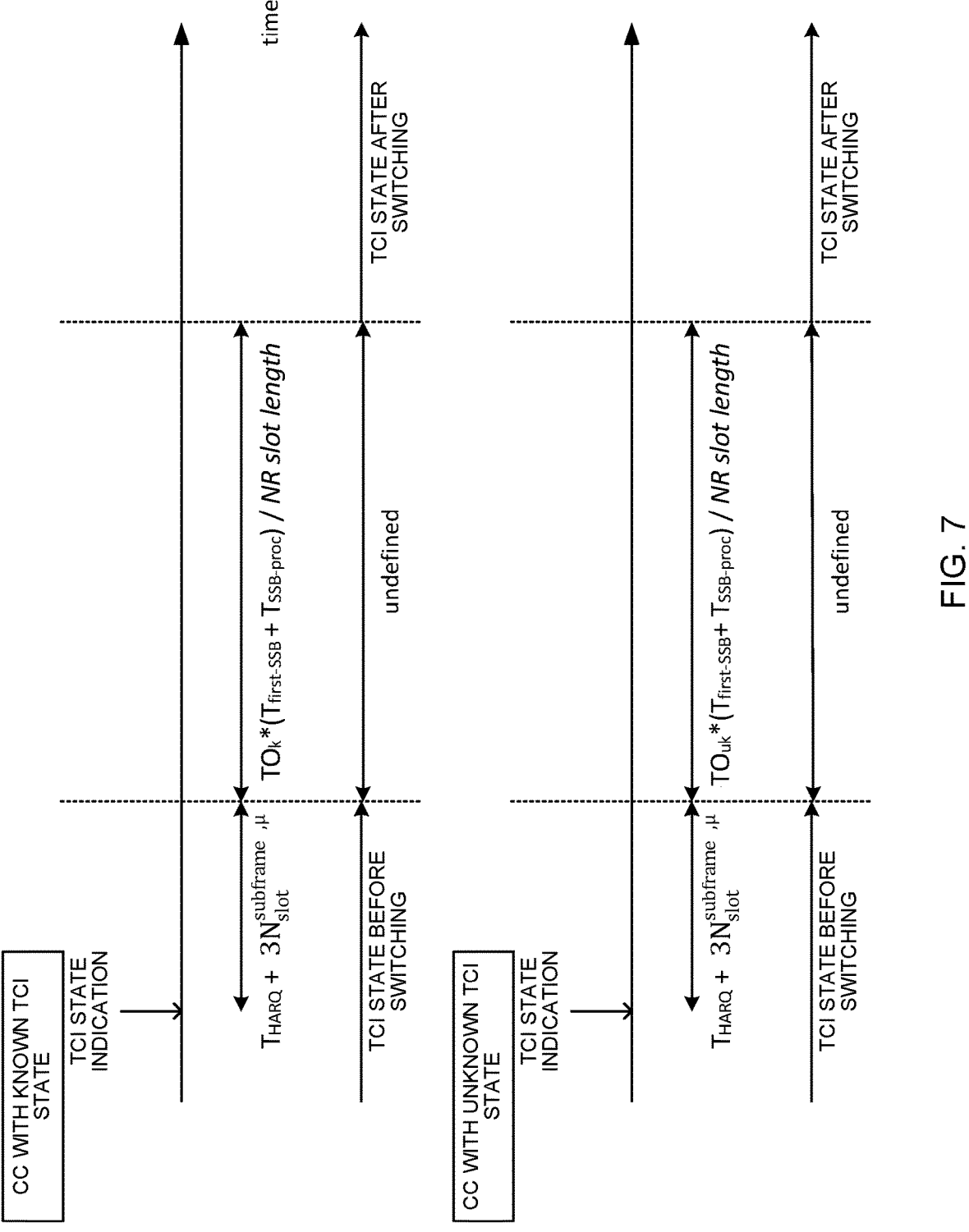
FIG. 7 is a diagram to show an example of a timeline for TCI state switching/activation in a certain CC according to a fifth embodiment.

FIG. 7 is a diagram to show an example of a timeline for TCI state switching/activation in the certain CC according to the fifth embodiment. In the example shown in FIG. 7, delay time for TCI state switching/activation in a CC with a known TCI state (for example, a known TCI state in a CC in which beam reporting is configured) is similar to that of FIG. 6.

On the other hand, in the example shown in FIG. 7, assume that a root SSB in a TCI state in a CC in which beam reporting is not configured is the same as a root SSB in the known TCI state in the CC in which the beam reporting is configured. In this case, as shown in FIG. 7, delay time for TCI state switching/activation in the CC in which the beam reporting is not configured becomes equal to the delay time for TCI state switching/activation in the CC having the known TCI state (for example, the known TCI state in the CC in which the beam reporting is configured).

Figure 8:
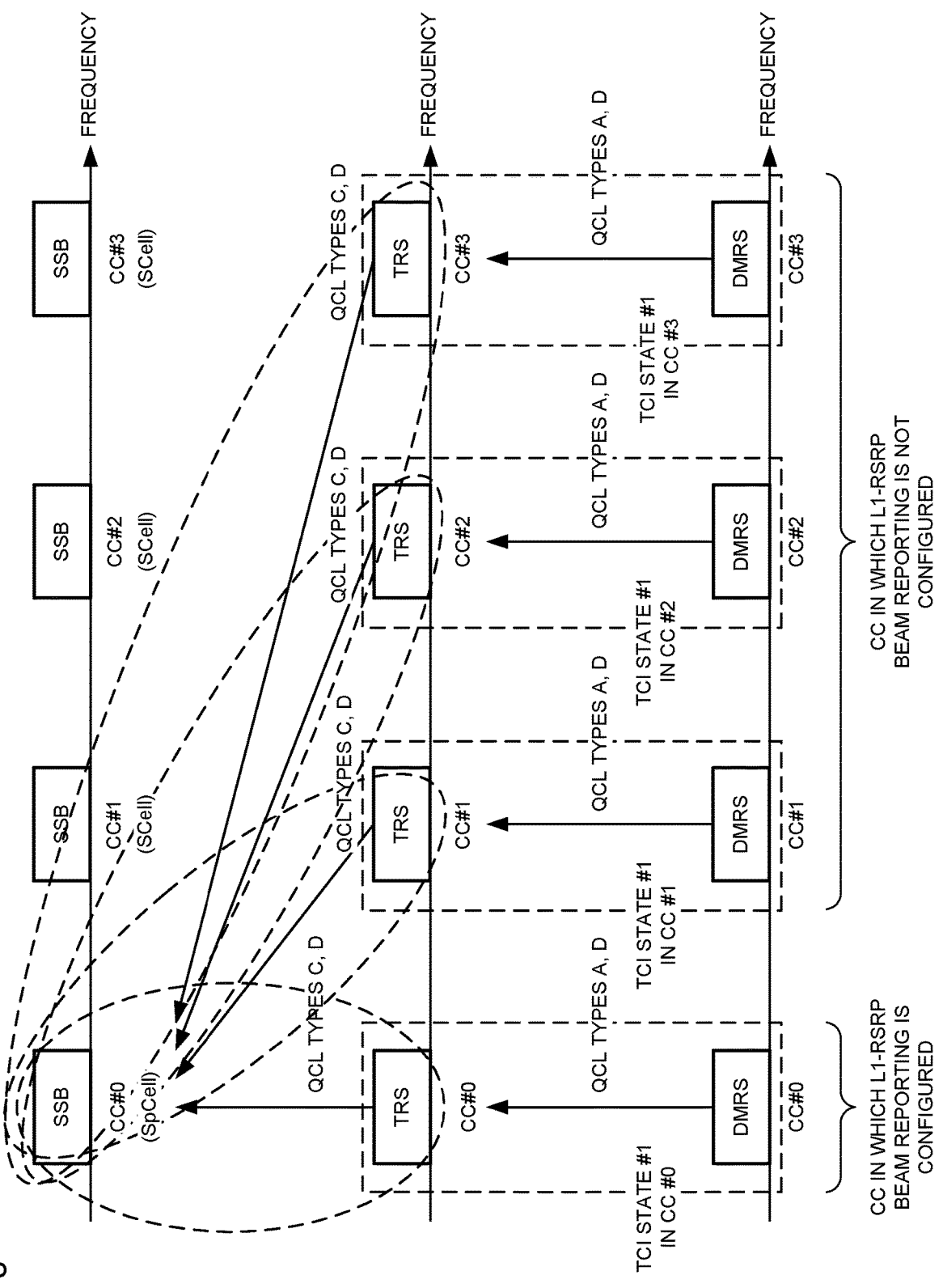
FIG. 8 is a diagram to show an example of TCI states and QCL relationships for a plurality of CCs.

FIG. 8 is a diagram to show an example of TCI states and QCL relationships for a plurality of CCs. In FIG. 8, CC #0 being a special cell (SpCell) (primary cell (PCell) or primary secondary cell (PSCell)) and CC #1, CC #2, and CC #3 being SCells are configured. In each CC, an SSB, a TRS, and a PDCCH DMRS (simply described as a DMRS) are trans-mitted.

Note that in the present disclosure, the PDCCH DMRS may be interpreted as a PDSCH DMRS. Also, a TCI state for a PDCCH may be interpreted as a TCI state for a PDSCH.

In the example shown in FIG. 8, TRSs in respective CCs are in relationships of QCL types C and D (which may be referred to as a TCI state for a PDCCH in CC #N (N=0, 1, 2, or 3)) with an SSB in CC #0, and PDCCH DMRSs in the respective CCs are in relationships of QCL types A and D (which may be referred to as a TCI state for a TRS in CC #N) with TRSs in the same CCs. In this case, all of the TRSs in the same CCs being in a relationship of QCL type D with the DMRSs in the respective CCs cause the SSB in CC #0 to be a QCL source RS (root SSB). L1-RSRP beam reporting is configured in CC #0, and L1-RSRP beam reporting is not configured in another CC.

In FIG. 8, a TCI state for a PDCCH in CC #0 in which the L1-RSRP beam reporting is configured (described as TCI state #1 in CC #0) is known.

In this case, application of an unknown condition in TCI state switching/activation in CC #1 to CC #3 is unnecessary. The UE may judge that delay time related to received power measurement (for example, $T_{L1\text{-}RSRP}$) is reduced (for example, $T_{L1\text{-}RSRP}$ becomes 0) in CC #0 to CC #3. The UE may judge/assume that delay time necessary for TCI state switching/activation in a CC in which beam reporting is not configured is equal to the delay time necessary for the TCI state switching/activation in a CC in which beam reporting is configured (CC corresponding to a known TCI state).

Figure 9:
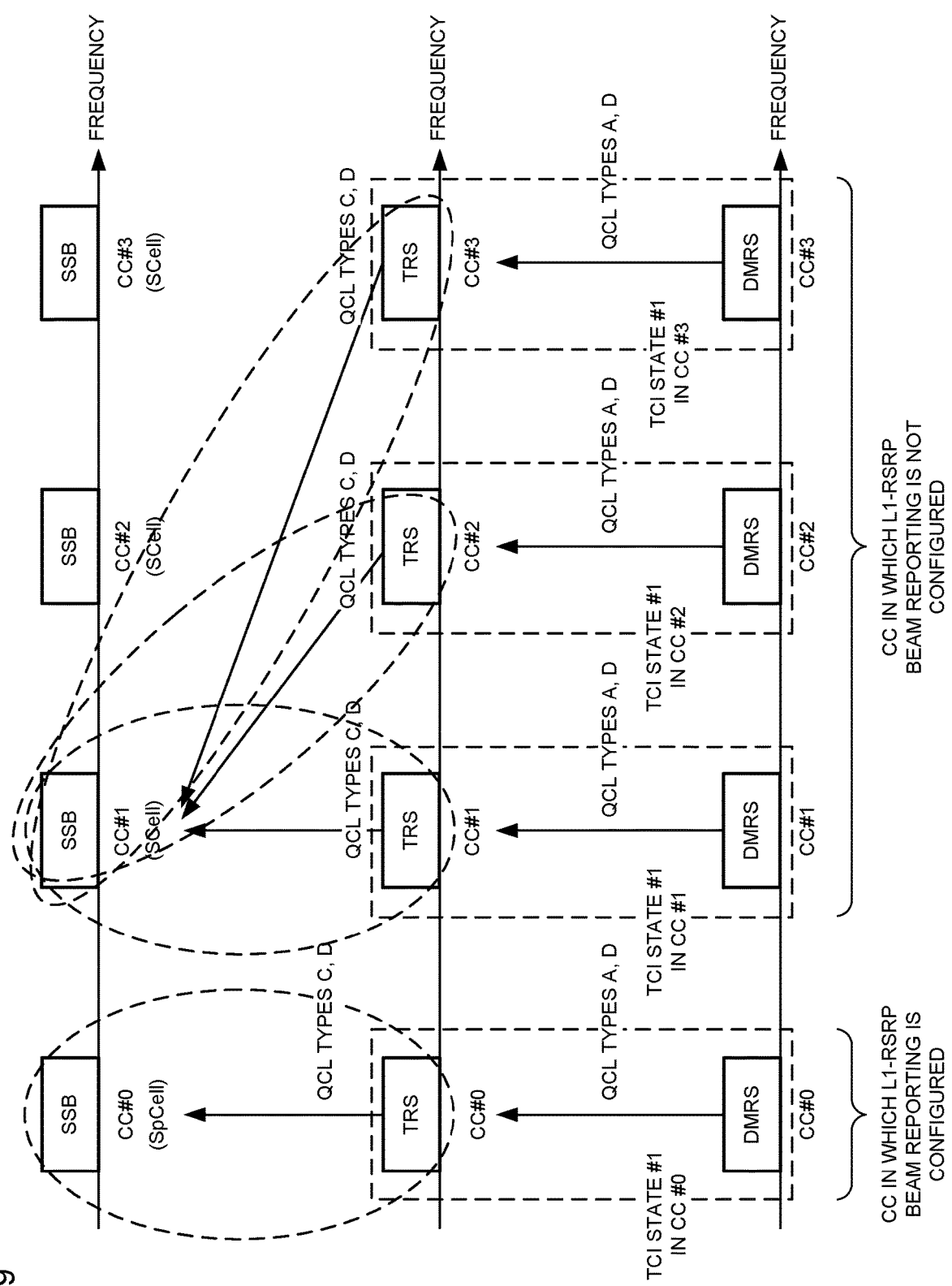
FIG. 9 is a diagram to show another example of the TCI states and QCL relationships for the plurality of CCs.

FIG. 9 is a diagram to show another example of the TCI states and QCL relationships for the plurality of CCs. FIG. 9 is different from FIG. 8 in that all of TRSs in the same CCs being in a relationship of QCL type D with DMRSs in CC #1 to CC #3 cause an SSB in CC #1 to be a QCL source RS (root SSB, this root SSB is different from a root SSB in CC #0).

In the example shown in FIG. 9, when TCI state #1 in CC #1 is known, the UE judges/assumes that TCI states #1 in CC #2 and CC #3 are known. In the example shown in FIG. 9, when TCI state #1 in CC #1 is not known, the UE judges/assumes that TCI states #1 in CC #2 and CC #3 are not known.

Note that only when a root SSB is common to CCs, known or unknown relationships may be related to/synchro-nized with each other between different CCs. For example, in the example shown in FIG. 9, even if a TCI state in CC #0 is known, TCI states in CC #1 to CC #3 having a root SSB different from the root SSB in CC #0 may not be necessarily known.

According to the above fifth embodiment, even when carrier aggregation is used, it is possible to appropriately determine delay time for TCI state switching/activation.

Sixth Embodiment

A higher layer parameter (RRC information element)/UE capability corresponding to at least one function (character-istic, feature) in the first to fifth embodiments may be defined. The UE capability may indicate that this function is supported.

A UE for which the higher layer parameter corresponding to the function has been configured may perform the func-tion. A "case that a UE for which the higher layer parameter corresponding to the function has not been configured does not perform the function" may be defined.

A UE that has reported the UE capability indicating that the function is supported may perform the function. A "case that a UE that has not reported the UE capability indicating that the function is supported does not perform the function" may be defined.

When a UE has reported the UE capability indicating that the function is supported, and the higher layer parameter corresponding to the function has been configured, the UE may perform the function. A "case that when a UE has not reported the UE capability indicating that the function is supported or when the higher layer parameter corresponding to the function has not been configured, the UE does not perform the function" may be defined.

For example, the UE capability/higher layer parameter may be defined by whether to support measurement/storing of a QCL property of one or more QCL source RSs (for example, root SSBs).

For example, the UE capability/higher layer parameter may be defined by the number of TCI states/RSs capable of supporting measurement/storing of a QCL property of the QCL source RS. For example, the UE capability/higher layer parameter may be defined by number X described in Embodiment 1-2-2 described above.

For example, the UE capability/higher layer parameter may be defined by whether to support TCI state activation (determination of a spatial domain filter) based on a CSI-RS/TRS.

For example, the UE capability/higher layer parameter may be defined by whether to support reporting of information (for example, a list) about a TCI state ID/RS ID of a known TCI state, the reporting using a MAC CE/UCI. For example, the UE capability/higher layer parameter may be defined by the number of reports of information (for example, a list) about a TCI state ID/RS ID of a known TCI state, the reports using a MAC CE/UCI.

For example, the UE capability/higher layer parameter may be defined by whether to support reporting of a specific number (for example, 4) of beams or more in beam reporting. For example, the UE capability/higher layer parameter may be defined by the number of reports in a case where a specific number (for example, 4) of beams or more are reported in beam reporting.

For example, the UE capability/higher layer parameter may be defined by whether to support the above-described fifth embodiment. For example, the UE capability/higher layer parameter may be defined by the number of CCs capable of supporting the above-described fifth embodiment.

For example, the UE capability/higher layer parameter may be defined by whether to support aperiodic triggering/measurement/transmission of an SSB using a MAC CE/DCI.

For example, the UE capability/higher layer parameter may be defined by whether to support aperiodic triggering/measurement/transmission of an SSB/CSI-RS related to a target TCI state by using a MAC CE/RRC signaling to configure/indicate TCI state switching based on a MAC CE/TCI state switching based on RRC.

According to an above sixth embodiment, the UE can achieve the above-described function while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
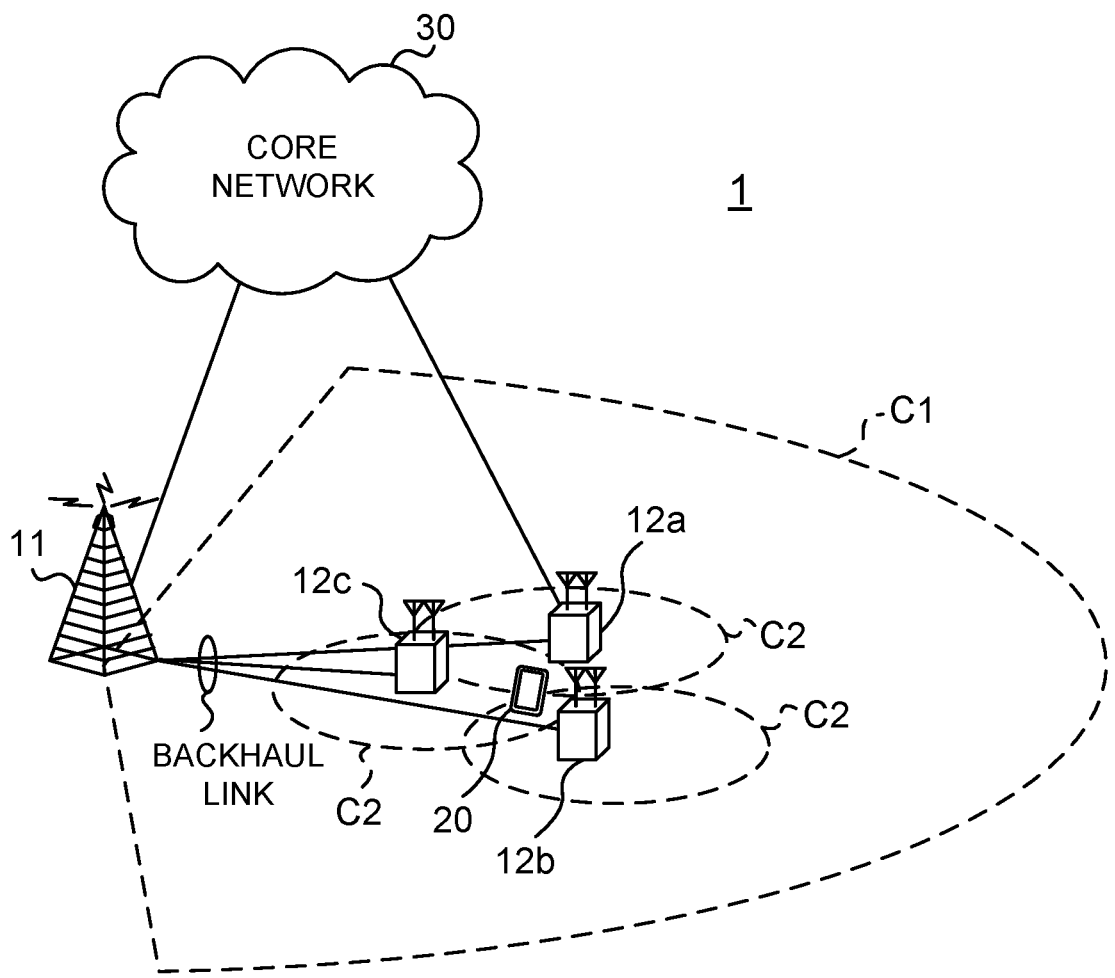
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
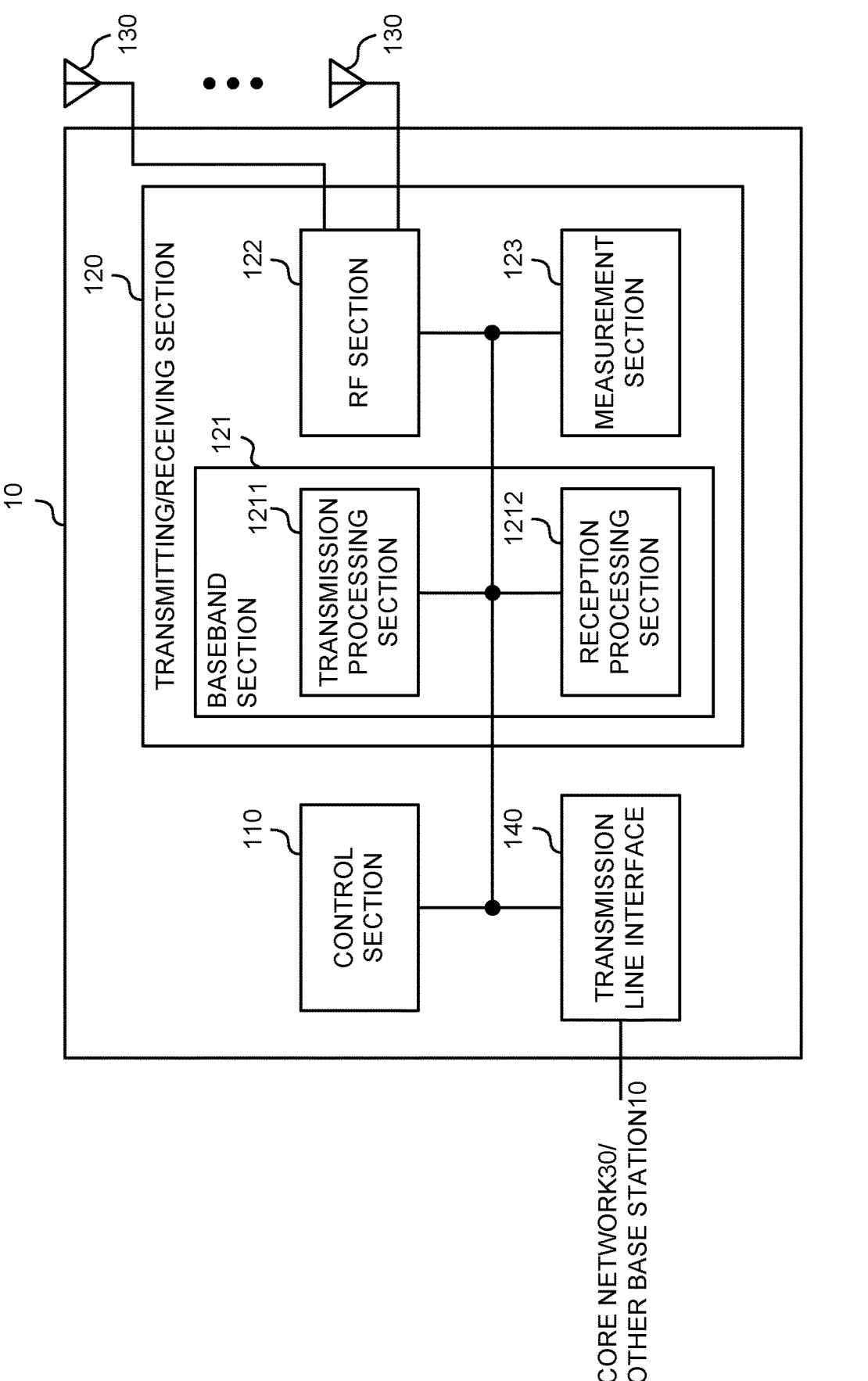
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/ receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and communication path interface 140.

The transmitting/receiving section 120 may transmit first information related to storing of information related to a quasi-co-location (QCL) source reference signal (RS) in a known transmission configuration indication (TCI) state, and second information related to indication of TCI state switching. The control section 110 may perform an indication of storing the information related to the QCL source RS based on the first information, and determine delay time required for application of the TCI state in switching of the TCI state, based on the first information and the second information (first and third embodiments).

The transmitting/receiving section 120 may transmit indication information about switching of a transmission configuration indication (TCI) state for a plurality of serving cells. The control section 110 may determine delay time for application of a TCI state in TCI state switching on the basis of information related to a quasi-co-location (QCL) source reference signal (RS) in the TCI state in each serving cell of the plurality of serving cells and the indication information (fifth embodiment).

(User Terminal)

Figure 12:
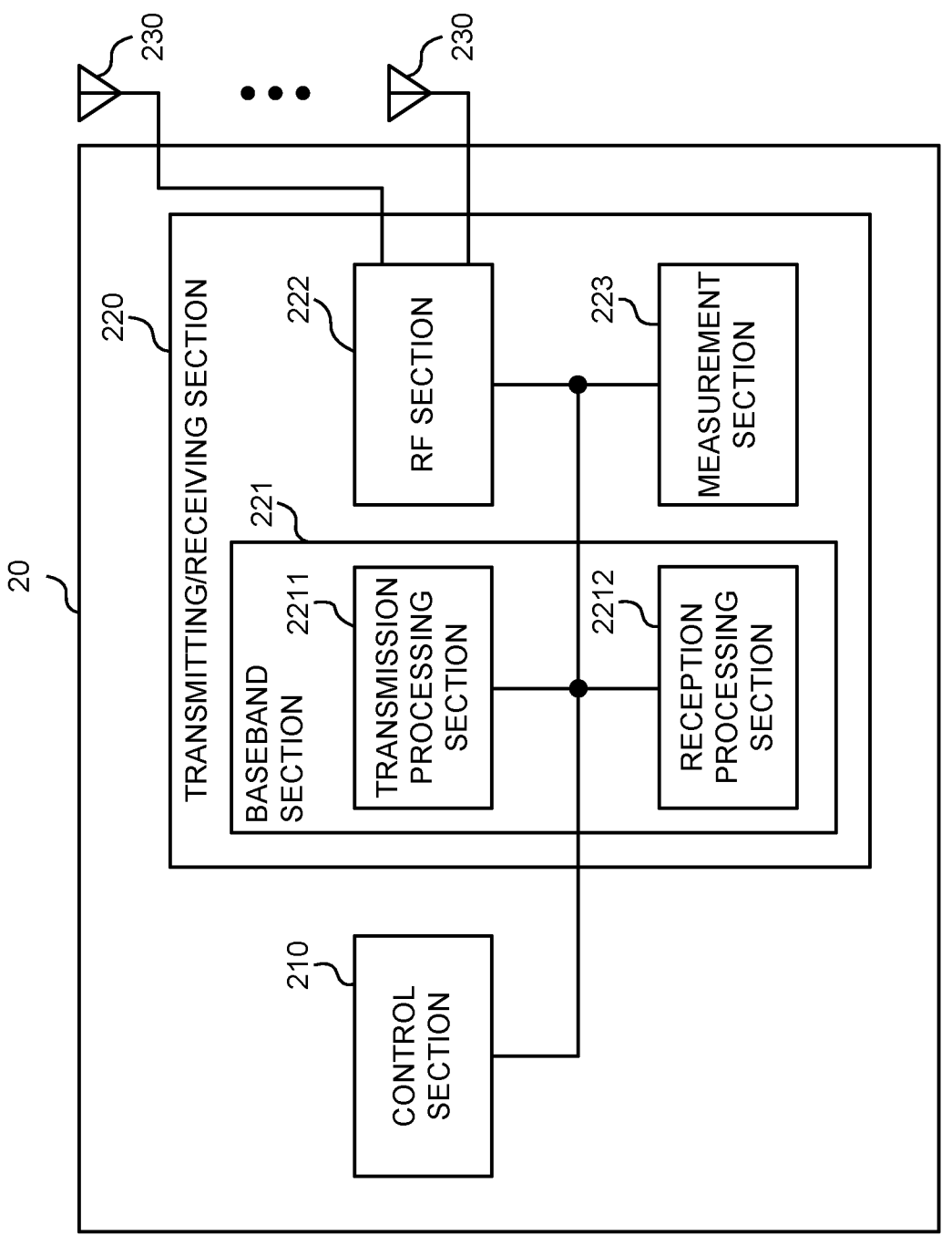
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive first information related to storing of information related to a quasi-co-location (QCL) source reference signal (RS) in a known transmission configuration indication (TCI) state, and second information related to indication of TCI state switching. The control section 210 may store the information related to the QCL source RS on the basis of the first information, and may determine delay time for application of a TCI state in TCI state switching on the basis of the first information and the second information (first and third embodiments).

The first information may be at least one of a higher layer parameter for configuring storing of the information related to the QCL source RS in the known TCI state, information related to the number of known TCI states to be stored, one or more known TCI state IDs to be stored, a reference signal ID associated with one or more known TCI states to be stored, and a control resource set ID related to one or more TCI states to be stored (first embodiment).

The control section 210 may judge, on the basis of the first information, delay time related to synchronization signal block reception out of the delay time (first embodiment).

The control section 210 may control transmission of information (for example, a MAC CE/UCI) related to a known TCI state (third embodiment).

The transmitting/receiving section 220 may receive indication information about switching of a transmission configuration indication (TCI) state for a plurality of serving cells. The control section 210 may determine delay time for application of a TCI state in TCI state switching on the basis of information related to a quasi-co-location (QCL) source reference signal (RS) in the TCI state in each serving cell of the plurality of serving cells and the indication information (fifth embodiment).

When a QCL source RS in a TCI state in a certain serving cell of the plurality of serving cells is related to a known TCI state, the control section 210 may judge that the delay time in the certain serving cell does not include time related to measurement of reference signal received power (fifth embodiment).

When a QCL source RS in a TCI state in a certain serving cell of the plurality of serving cells is not related to a known TCI state, the control section 210 may judge that the delay time in the certain serving cell includes time related to measurement of reference signal received power (fifth embodiment).

The QCL source RS may be a synchronization signal block in a serving cell different from the certain serving cell (fifth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
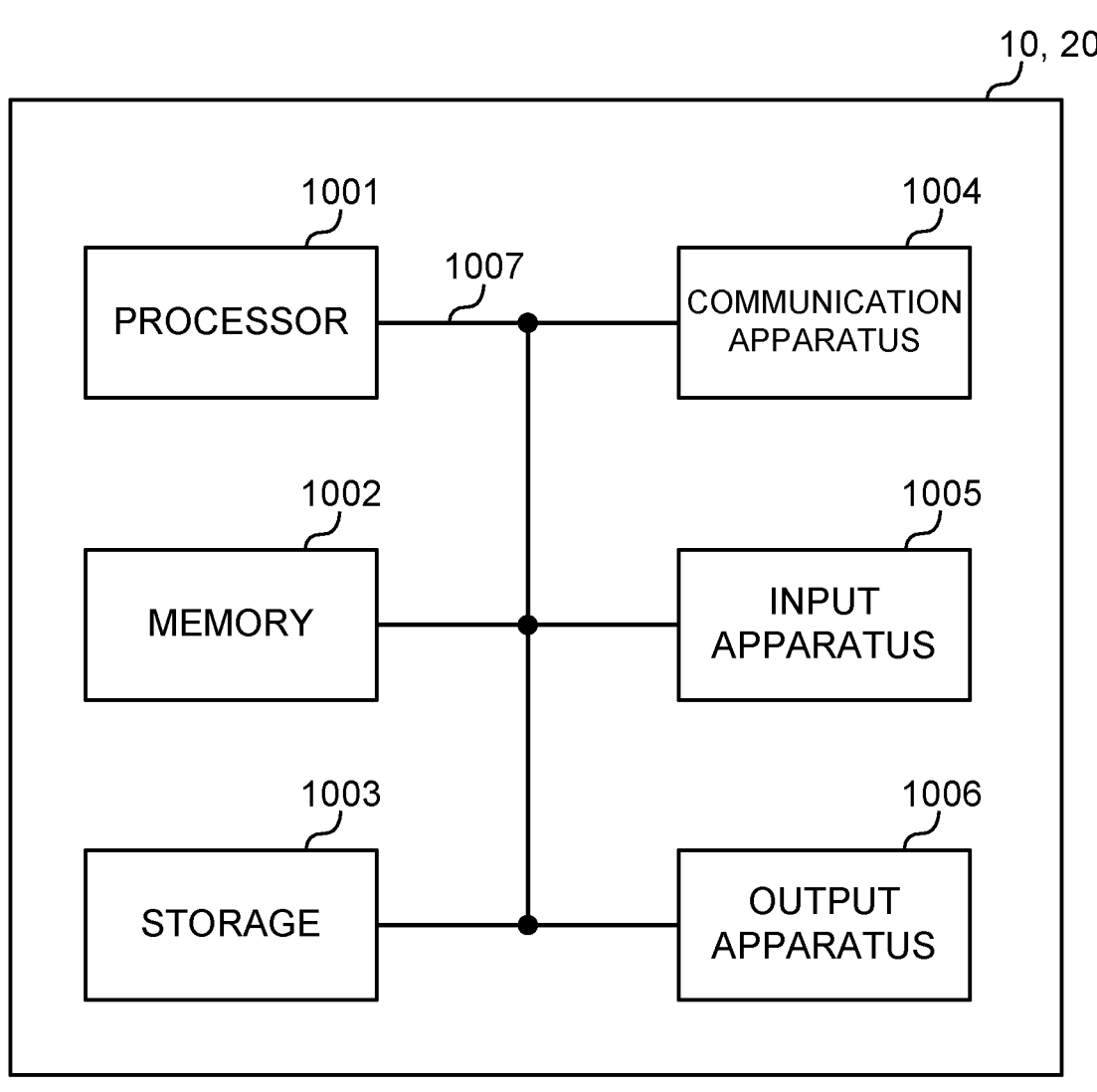
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink," "downlink," and the like may be interpreted as the words corresponding to the terminal-to-terminal communication (for example, "side-link"). For example, an uplink channel, a downlink channel, and the like may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives indication information about switching of a transmission configuration indication (TCI) state for a plurality of serving cells; and a processor that determines a delay time necessary for application of a TCI state in TCI state switching, based on the indication information and information regarding a quasi co-location (QCL) source reference signal (RS) in the TCI state in each serving cell of the plurality of serving cells, wherein when a TCI state in a certain serving cell of the plurality of serving cells is known, the processor determines that the delay time in the certain serving cell does not include a time related to measurement of reference signal received power (RSRP).

2. The terminal according to claim 1, wherein when a TCI state in a certain serving cell of the plurality of serving cells is unknown, the processor determines that the delay time in the certain serving cell includes a time related to measurement of reference signal received power (RSRP).

3. A radio communication method for a terminal, comprising:

receiving indication information about switching of a transmission configuration indication (TCI) state for a plurality of serving cells;

determining a delay time necessary for application of a TCI state in TCI state switching, based on the indication information and information regarding a quasi co-location (QCL) source reference signal (RS) in the TCI state in each serving cell of the plurality of serving cells; and determining that the delay time in the certain serving cell does not include a time related to measurement of reference signal received power (RSRP) when a TCI state in a certain serving cell of the plurality of serving cells is known.

4. A base station comprising:

a transmitter that transmits indication information about switching of a transmission configuration indication (TCI) state for a plurality of serving cells; and a processor that determines a delay time necessary for application of a TCI state in TCI state switching, based on the indication information and information regarding a quasi co-location (QCL) source reference signal (RS) in the TCI state in each serving cell of the plurality of serving cells, wherein when a TCI state in a certain serving cell of the plurality of serving cells is known, the processor determines that the delay time in the certain serving cell does not include a time related to measurement of reference signal received power (RSRP).

5. A system comprising a terminal and a base station, wherein the terminal comprises:

a receiver that receives indication information about switching of a transmission configuration indication (TCI) state for a plurality of serving cells; and a processor that determines a delay time necessary for application of a TCI state in TCI state switching, based on the indication information and information regarding a quasi co-location (QCL) source reference signal (RS) in the TCI state in each serving cell of the plurality of serving cells, wherein when a TCI state in a certain serving cell of the plurality of serving cells is known, the processor determines that the delay time in the certain serving cell does not include a time related to measurement of reference signal received power (RSRP), and the base station comprises:

a transmitter that transmits the indication information.

* * * * *